(12) United States Patent
Xing et al.

(10) Patent No.: US 10,984,565 B2
(45) Date of Patent: Apr. 20, 2021

(54) IMAGE PROCESSING METHOD USING CONVOLUTIONAL NEURAL NETWORK, IMAGE PROCESSING DEVICE AND STORAGE MEDIUM

(71) Applicants: Tsinghua University, Beijing (CN); NUCTECH COMPANY LIMITED, Beijing (CN)

(72) Inventors: Yuxiang Xing, Beijing (CN); Kaichao Liang, Beijing (CN); Le Shen, Beijing (CN); Li Zhang, Beijing (CN); Hongkai Yang, Beijing (CN); Kejun Kang, Beijing (CN); Zhiqiang Chen, Beijing (CN); Jianmin Li, Beijing (CN); Yinong Liu, Beijing (CN)

(73) Assignees: Tsinghua University, Beijing (CN); NUCTECH COMPANY LIMITED, Beijing (CN)

( * ) Notice: Subject to any disclaimer, the term of this patent is extended or adjusted under 35 U.S.C. 154(b) by 215 days.

(21) Appl. No.: 16/235,882

(22) Filed: Dec. 28, 2018

(65) Prior Publication Data

US 2019/0206095 A1 Jul. 4, 2019

(30) Foreign Application Priority Data

Dec. 29, 2017 (CN) .......................... 201711498783.0

(51) Int. Cl.
*G06T 11/00* (2006.01)
*G06N 3/08* (2006.01)

(52) U.S. Cl.
CPC .......... *G06T 11/006* (2013.01); *G06N 3/084* (2013.01); *G06T 11/003* (2013.01); *G06T 2211/421* (2013.01); *G06T 2211/436* (2013.01)

(58) Field of Classification Search
CPC ................. G06T 11/006; G06T 11/003; G06T 2211/421; G06T 2211/436; G06T 11/005;
(Continued)

(56) References Cited

U.S. PATENT DOCUMENTS

2019/0108441 A1* 4/2019 Thibault .............. G01N 23/046

OTHER PUBLICATIONS

Hammernik, Kerstin, et al., "A Deep Learning Architecture for Limited-Angle Computed Tomography Reconstruction," *Bildverabeitung für Die Medizin 2017*, Jan. 1, 2017 (pp. 92-97).
(Continued)

*Primary Examiner* — Siamak Harandi
(74) *Attorney, Agent, or Firm* — Christensen, Fonder, Dardi & Herbert PLLC

(57) ABSTRACT

An image processing method, comprising: acquiring, by a CT scanning system, projection data of an object; and processing, by using a convolutional neural network, the projection data, to acquire an estimated image of the object. The convolutional neural network comprises: a projection domain network for processing input projection data to obtain estimated projection data; an analytical reconstruction network layer for performing analytical reconstruction to obtain a reconstructed image; an image domain network for processing the reconstructed image to obtain an estimated image, a projection layer for performing a projection operation by using a system projection matrix of the CT scanning system, to obtain a projection result of the estimated image; and a statistical model layer for determining consistency among the input projection data, the estimated projection data, and the projection result of the estimated image based on a statistical model.

18 Claims, 10 Drawing Sheets
(4 of 10 Drawing Sheet(s) Filed in Color)

(58) Field of Classification Search
CPC ......... G06T 11/008; G06T 2207/10081; G06T 2207/20084; G06T 2207/20088; G06T 2211/416; G06N 3/084; G06N 3/0454; A61B 6/03; G01N 23/04
See application file for complete search history.

(56) References Cited

OTHER PUBLICATIONS

Rojas, R., "Chapter 7: The backpropagation algorithm," *Neural Networks—A Systematic Introduction*, Jan. 1, 1996 (pp. 164-173).
Würfl, Tobias, et al., "Deep Learning Computed Tomography," *Medical Image Computing and Computer-Assisted Intervention (MICCAI) 2016, Lecture Notes in Computer Science*, vol. 9902, Oct. 2, 2016 (pp. 432-440).

\* cited by examiner

IMAGE PROCESSING METHOD USING CONVOLUTIONAL NEURAL NETWORK, IMAGE PROCESSING DEVICE AND STORAGE MEDIUM

CROSS-REFERENCE TO RELATED APPLICATION(S)

This application claims priority to the Chinese Patent Application No. 201711498783.0, filed on Dec. 29, 2017, which is incorporated herein by reference in its entirety.

TECHNICAL FIELD

The embodiments of the present disclosure relate to radiation imaging, and more particularly, to an image processing method, an image processing device and a storage medium.

BACKGROUND

X-ray Computerized-Tomography (CT) imaging systems have been widely used in fields such as medical treatment, security inspection, industrial non-destructive detection etc. Ray sources and detectors collect data of a series of attenuation signals according to a certain trajectory, the data of the series of attenuation signals is preprocessed, and a three-dimensional spatial distribution of linear attenuation coefficients of an object to be inspected may be obtained through recovery using an image reconstruction algorithm. CT image reconstruction process is to recover linear attenuation coefficient distribution from data acquired by the detectors. Currently, analytical reconstruction algorithms such as filtered back-projection, Feldkmap-Davis-Kress (FDK) etc. and iterative reconstruction methods such as Algebra Reconstruction Technique (ART), Maximum A Posterior (MAP) etc. are mainly used in practical applications.

With the increasing diversity of demands for X-ray CT imaging, the requirements for reducing radiation dose have become higher and higher. Techniques for CT image reconstruction using a convolutional neural network have been proposed. However, reconstruction methods using convolutional neural networks require supervised training in a process of training the neural networks. Such a method requires acquiring a large number of real images as labels, that is, the convolutional neural network requires both projection data of low quality and projection data (ground truth value) of high quality.

SUMMARY

According to the embodiments of the present disclosure, there are proposed an image processing method, an image processing device and a storage medium.

According to an aspect of the present disclosure, there is proposed an image processing method, comprising:

acquiring, by a Computerized-Tomography (CT) scanning system, projection data of an object; and processing, by using a convolutional neural network, the projection data, to acquire an estimated image of the object;

wherein the convolutional neural network comprises: a projection domain network for processing input projection data to obtain estimated projection data; an analytical reconstruction network layer for performing analytical reconstruction on the estimated projection data to obtain a reconstructed image; an image domain network for processing the reconstructed image to obtain an estimated image, a projection layer for performing a projection operation on the estimated image by using a system projection matrix of the CT scanning system, to obtain a projection result of the estimated image; and a statistical model layer for determining consistency among the input projection data, the estimated projection data, and the projection result of the estimated image based on a statistical model;

wherein the image processing method comprises training the convolutional neural network by: adjusting parameters of convolutional kernels of the image domain network and the projection domain network by using a consistency cost function of a data model based on the input projection data, the estimated projection data, and the projection result of the estimated image.

According to an embodiment of the present disclosure, training the neural network further comprises: constructing a cost function consistent with the projection from estimated image using the projection layer, constructing a likelihood relation cost function using the statistical model layer, and forming the consistency cost function of the data model using at least one of the cost function consistent with the projection and the likelihood relation cost function.

According to an embodiment of the present disclosure, the convolutional neural network further comprises at least one priori model layer for adjusting the image domain network by using a priori model cost function based on the estimated image, and performing back propagation of gradients through the analytical reconstruction network layer to adjust parameters of a convolutional kernel of the projection domain network.

According to an embodiment of the present disclosure, a forward propagation process of the projection domain network, the analytical reconstruction network layer and the image domain network comprises:

expressing input projection data of the projection domain network as $g=\{g_1, g_2, \ldots, g_M\}$, expressing estimated projection data output by the projection domain network as $\tilde{g}=\{\tilde{g}_1, \tilde{g}_2, \ldots, \tilde{g}_{M'}\}$, wherein $M' \geq M$, after the estimated projection data is weighted, obtaining $\text{Diag}(W)\tilde{g}=\{W_1\tilde{g}_1, W_2\tilde{g}_2, \ldots, W_{M'}\tilde{g}_{M'}\}$, after the weighted projection data passes through a ramp filtering layer, obtaining $h \otimes \text{Diag}(W)\tilde{g}$, after the filtered data is back-projected, obtaining an output of the analytical reconstruction layer as $\tilde{f}=H_R^T h \otimes \text{Diag}(W)\tilde{g}$, and assuming that $\varphi_N$ represents a processing function of the image domain network, obtaining the estimated image output by the image domain network as $\hat{f}=\varphi_N(\tilde{f})$, wherein a superscript T represents transposition of a matrix, h is a discrete ramp filtering operator, $H_R$ is a system matrix for $M' \times N$ dimensional reconstruction, N is a total number of pixels of the reconstructed image, and $W_1, W_2, \ldots, W_M$ represent weighting coefficients.

According to an embodiment of the present disclosure, the consistency cost function of the data model is expressed as $\Psi(\tilde{g}; H\hat{f}, g)=L(g; \tilde{g})+\beta\|\tilde{g}-H\hat{f}\|^2$, and error transfer relations from the consistency of the data model are $$\frac{\partial \Psi}{\partial \tilde{g}} = \frac{\partial L(g; \tilde{g})}{\partial \tilde{g}} + 2\beta(\tilde{g} - H\hat{f}) \text{ and } \frac{\partial \Psi}{\partial \hat{f}} = 2\beta H^T(H\hat{f} - \tilde{g}),$$

wherein $L(g; \tilde{g})$ is a likelihood relation cost function, the smaller the $L(g; \tilde{g})$ becomes, the more consistent the projection data g and the estimated projection data $\tilde{g}$ will be, $\beta\|\tilde{g}-H\hat{f}\|^2$ is a cost function consistent with the projection, $\beta$ is a Lagrangian multiplier parameter, and H is a system projection matrix.

According to an embodiment of the present disclosure, the priori model cost function $\varphi(\hat{f})$ comprises one or a combination of is a total variation of local conditions, a Markov field priori, a texture priori, and sparsity of a feature space, wherein $\hat{f}$ is the estimated image.

According to an embodiment of the present disclosure, training the neural network further comprises: defining a priori model cost function $\varphi(\hat{f})$ using a priori error $\varepsilon^{Pr}$ as $\varepsilon^{Pr}=\varphi(\hat{f})$.

According to an embodiment of the present disclosure, importance $\lambda$ of each prior model cost function $\varphi(\hat{f})$ in an error feedback process is used to adjust the image domain network.

According to an embodiment of the present disclosure, in the analytical reconstruction network layer, a priori error of the analytical reconstruction network layer is back-propagated according to the following propagation relation:

$$\frac{\partial \varepsilon^{Pr}}{\partial \tilde{g}} = \text{Diag}(W)\left(h \otimes H_R \frac{\partial \varepsilon^{Pr}}{\partial \tilde{f}}\right)$$

where input projection data of the projection domain network is expressed as $g=\{g_1, g_2, \ldots, g_M\}$, estimated projection data output by the projection domain network is expressed as $\tilde{g}=\{\tilde{g}_1, \tilde{g}_2, \ldots, \tilde{g}_{M'}\}$, wherein $M' \geq M$, after the output is weighted, $\text{Diag}(W)\tilde{g}=\{W_1\tilde{g}_1, W_2\tilde{g}_2, \ldots, W_{M'}\tilde{g}_{M'}\}$ is obtained, after the weighted output passes through a ramp filtering layer, $h \otimes \text{Diag}(W)\tilde{g}$ is obtained, after the output from the ramp filtering layer is back-projected, an output of the analytical reconstruction network layer is $\hat{f}=H_R^T h \otimes \text{Diag}(W)\tilde{g}$, wherein a superscript T represents transposition of a matrix, h is a discrete ramp filtering operator, $H_R$ is a system matrix for M'×N dimensional reconstruction, N is a total number of pixels of the reconstructed image, and $W_1, W_2, \ldots, W_M$ represent weighting coefficients.

According to an embodiment of the present disclosure, the processing function of the image domain network is represented by $\varphi_N$ as $\tilde{f}=\varphi_N(\hat{f})$, and then the priori error is back-propagated according to the following propagation relation:

$$\frac{\partial \varepsilon^{Pr}}{\partial \tilde{g}} = \text{Diag}(W)\left(h \otimes H_R \frac{\partial \varepsilon^{Pr}}{\partial \tilde{f}} \cdot \frac{\partial \hat{f}}{\partial \tilde{f}}\right) = \text{Diag}(W)\left(h \otimes H_R \frac{\partial \varphi(\hat{f})}{\partial \hat{f}} \cdot \frac{\partial \varphi_N(\tilde{f})}{\partial \tilde{f}}\right).$$

According to an embodiment of the present disclosure, the method further comprises: propagating $$\frac{\partial \Psi}{\partial \tilde{g}} \text{ and } \frac{\partial \varepsilon^{Pr}}{\partial \tilde{g}}$$

together to the projection domain network to update parameters of various layers.

According to an embodiment of the present disclosure, the method further comprises: acquiring attenuation signal data by the CT scanning system, and preprocessing the attenuation signal data to obtain input projection data.

According to an embodiment of the present disclosure, the method further comprises: acquiring the projection data of an object by the CT scanning system by using one of detector under-sampling scanning, sparse-angle scanning, intra-reconstruction scanning, limited-angle scanning, and straight line trajectory scanning.

According to an embodiment of the present disclosure, the projection domain network comprises a plurality of parallel convolutional neural network branches.

According to an embodiment of the present disclosure, the image domain network comprises a U-shaped convolutional neural network.

According to an embodiment of the present disclosure, training the neural network further comprises: pre-training supervisedly the convolutional neural network by using simulation data set.

According to another aspect of the present disclosure, there is proposed an image processing device, comprising:
a memory configured to store instructions and data, and
a processor configured to execute the instructions to:
receive projection data of an object acquired by a Computerized-Tomography (CT) scanning system; and
process the projection data by using a convolutional neural network, to acquire an estimated image of the object;
wherein the processor is further configured to construct the convolutional neural network to comprise: a projection domain network for processing input projection data to obtain estimated projection data; an analytical reconstruction network layer for performing analytical reconstruction on the estimated projection data to obtain a reconstructed image; and an image domain network for processing the reconstructed image to obtain an estimated image, a projection layer for performing a projection operation on the estimated image by using a system projection matrix of the CT scanning system, to obtain a projection result of the estimated image; and a statistical model layer for determining consistency among the input projection data, the estimated projection data, and the projection result of the estimated image based on a statistical model;
wherein the processor is further configured to train the convolutional neural network by: adjusting parameters of convolutional kernels of the image domain network and the projection domain network by using a consistency cost function of the data model based on the input projection data, the estimated projection data, and the projection result of the estimated image.

According to yet another aspect of the present disclosure, there is proposed a computer readable storage medium having computer instructions stored therein, which, when executed by a processor, implement the method according to the present disclosure.

BRIEF DESCRIPTION OF THE
ACCOMPANYING DRAWINGS

For better understanding of the embodiments of the present disclosure, the embodiments of the present disclosure will be described in detail with reference to the following accompanying drawings.

The patent application contains at least one drawing executed in color. Copies of this patent with color drawings will be provided by the Patent and Trademark Office upon request and payment of the necessary fee.

Figure 12A:
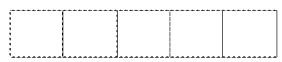
Figure 12B:
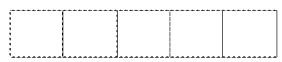
Figure 12C:
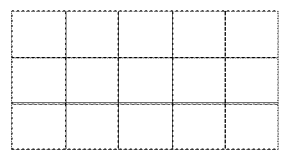
Figure 13A:
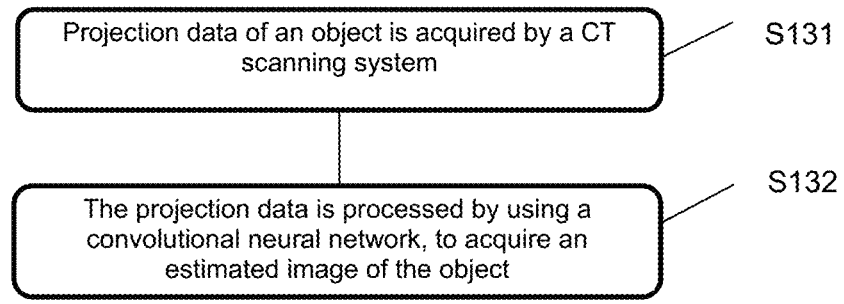
Figure 13B:
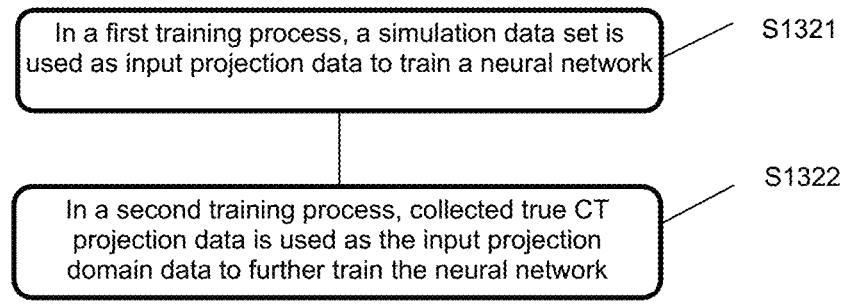
Figure 14:
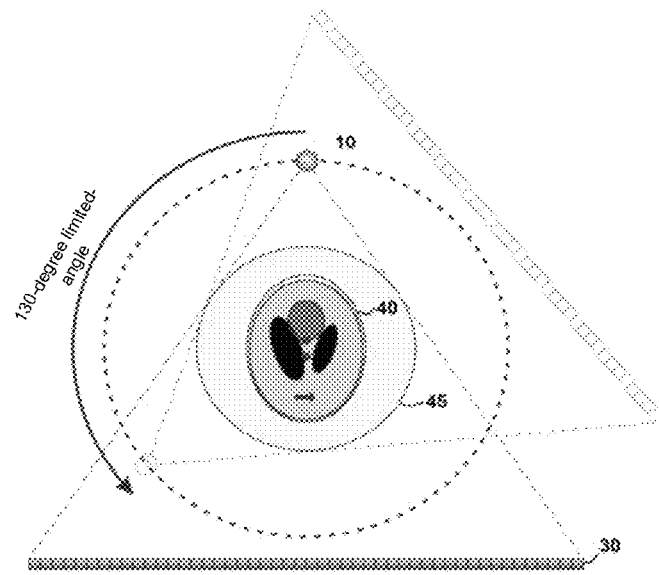
Figure 15:
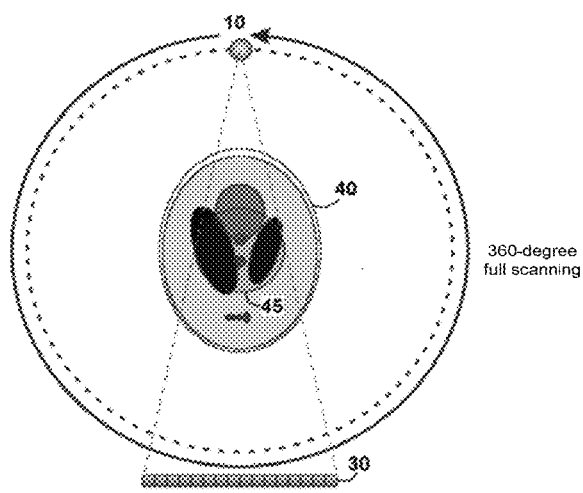
Figure 16:
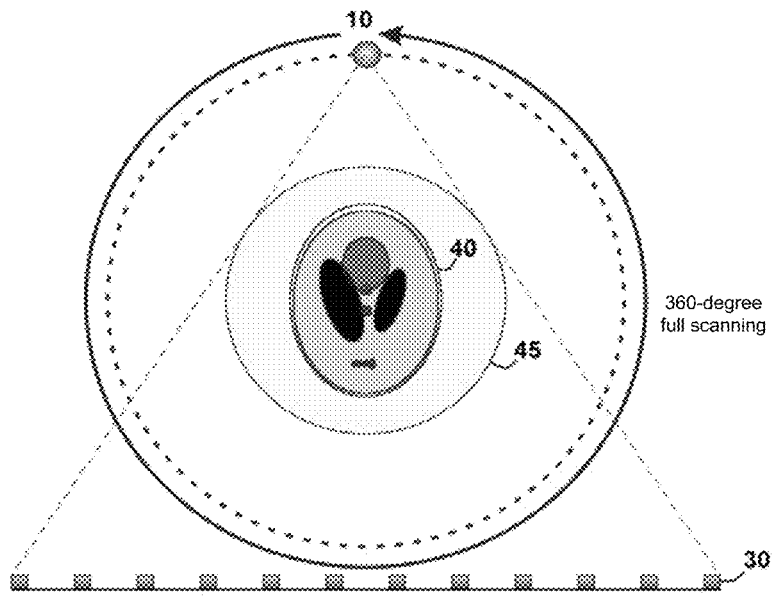
Figure 17:
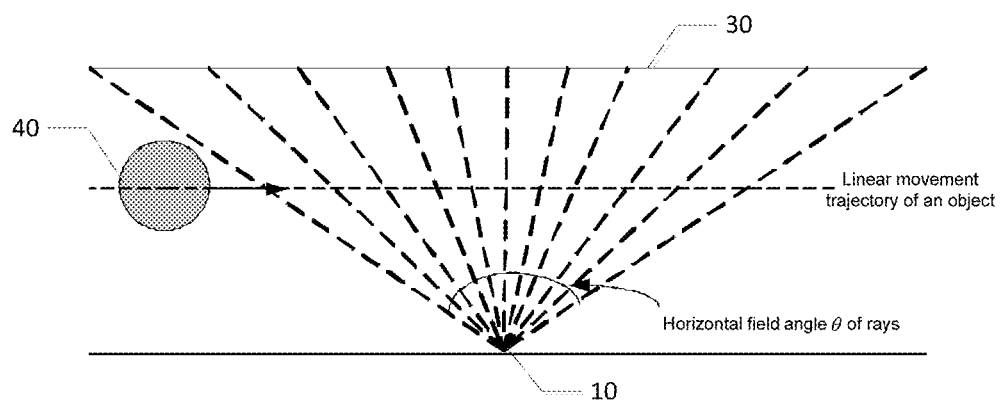

FIGS. 12A, 12B, and 12C illustrate a diagram of sizes of filter cores used in the device according to an embodiment of the present disclosure;

FIG. 13A is a schematic flowchart illustrating an image processing method according to an embodiment of the present disclosure;

FIG. 13B is a schematic flowchart illustrating a method for training a neural network according to an embodiment of the present disclosure;

FIG. 14 is a schematic diagram of a scanning apparatus which implements limited-angle CT scanning according to another embodiment of the present disclosure;

FIG. 15 is a schematic diagram of a scanning apparatus which implements an intra-reconstruction scanning method according to yet another embodiment of the present disclosure;

FIG. 16 is a schematic diagram of a scanning apparatus which implements a detector under-sampling scanning method according to yet another embodiment of the present disclosure; and FIG. 17 illustrates a schematic diagram of a scanning apparatus which implements straight line trajectory CT scanning according to yet another embodiment of the present disclosure.

DETAILED DESCRIPTION

The specific embodiments of the present disclosure will be described in detail below. It should be noted that the embodiments herein are used for illustration only, without limiting the embodiments of the present disclosure. In the description below, a number of specific details are explained to provide better understanding of the embodiments of the present disclosure. However, it is apparent to those skilled in the art that the embodiments of the present disclosure can be implemented without these specific details. In other instances, well known circuits, materials or methods are not described specifically so as not to obscure the embodiments of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

The embodiments of the present disclosure propose a method and device for training a neural network and an image processing method and device, wherein input projection data is processed by using a neural network to obtain estimated image of an object. The neural network may comprise a projection domain network, an analytical reconstruction network layer, an image domain network, a projection layer and a statistical model layer. The projection domain network processes input projection data to obtain estimated projection data. The analytical reconstruction network layer performs analytical reconstruction on the estimated projection data to obtain a reconstructed image. The image domain network processes the reconstructed image to obtain an estimated image. The projection layer performs a projection operation on the estimated image by using a system projection matrix of a Computerized-Tomography (CT) scanning system to obtain a projection result of the estimated image. The statistical model layer determines consistency among the input projection data, the estimated projection data, and the projection result of the estimated image based on a statistical model. Parameters of convolutional kernels of the image domain network and the projection domain network are adjusted by using a consistency cost function of a data model based on the input projection data, the estimated projection data, and the projection result of the estimated image. With the solutions according to the above-described embodiments of the present disclosure, an image with a higher quality may be reconstructed by the trained neural network when there is a defect in the projection data.

Figure 1:
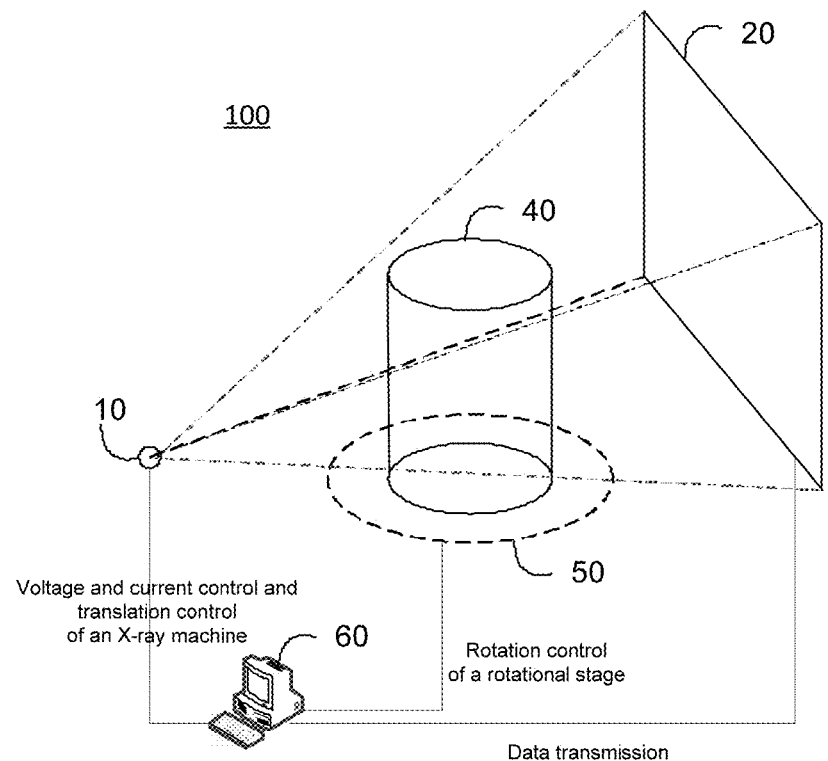
FIG. 1 illustrates a schematic structural diagram of a CT device according to an embodiment of the present disclosure.

FIG. 1 illustrates a schematic structural diagram of a CT device according to an embodiment of the present disclosure. As shown in FIG. 1, the CT device according to the present embodiment comprises an X-ray source 10, a mechanical movement apparatus 50, a detector and data acquisition system 20, and a control and data processing apparatus 60, so as to perform CT scanning and data processing on an object 40 to be inspected, for example, training of a neural network and reconstruction of an image using the trained network.

The X-ray source 10 may be, for example, an X-ray machine, and an appropriate focus size of the X-ray machine may be selected according to a resolution of imaging. In other embodiments, instead of using the X-ray machine, an X-ray beam may be generated using a linear accelerator etc.

The mechanical movement apparatus 50 comprises a stage, a rack, a control system, etc. The stage may be translated to adjust a position of a center of rotation. The rack may be translated to align the X-ray source (the X-ray machine) 10, the detector, and the center of rotation. In the present embodiment, the description is made according to a circular scanning trajectory or a spiral trajectory of a rotational stage and a fixed rack. As the movement of the stage with respect to the rack is a relative motion, the method according to the present embodiment may also be implemented by a fixed stage and a rotational rack.

The detector and data acquisition system 20 comprises an X-ray detector, a data acquisition circuit etc. A solid detector, a gas detector, or other detectors may be used as the X-ray detector; however, the embodiments of the present disclosure are not limited thereto. The data acquisition circuit comprises a readout circuit, an acquisition trigger circuit, a data transmission circuit etc.

The control and data processing apparatus 60 comprises, for example, a computer device installed with a control program and a data processing program, and is responsible for performing control of an operation process of the CT system, including mechanical rotation, electrical control, safety interlock control, etc., training a neural network, and reconstructing a CT image from the projection data using the trained neural network etc.

Figure 2:
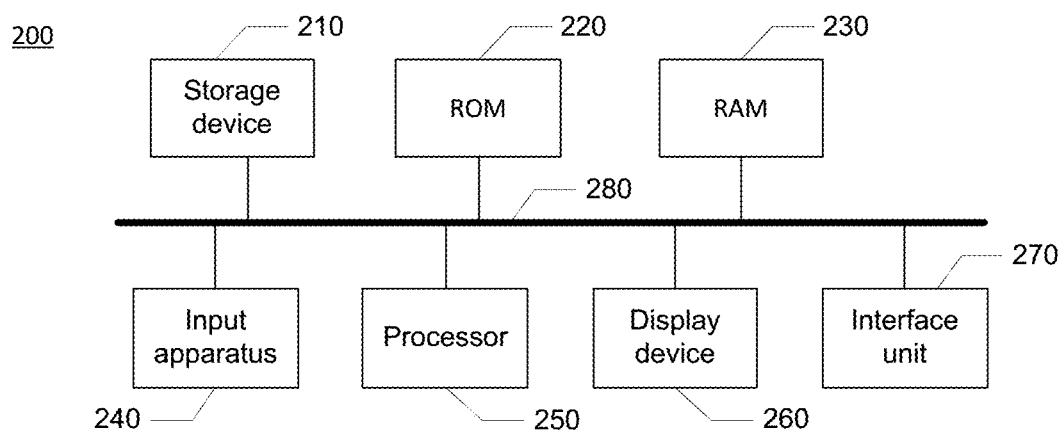
FIG. 2 is a schematic structural diagram of a control and data processing apparatus in the CT device shown in FIG. 1.

FIG. 2 illustrates a schematic structural diagram of a control and data processing device 200, for example, the control and data processing apparatus 60 shown in FIG. 1. As shown in FIG. 2, data collected by the detector and data acquisition system 20 is stored in a storage device 210 through an interface unit 270 and a bus 280. A Read-Only Memory (ROM) 220 has configuration information and programs of a computer data processor stored therein. A Random Access Memory (RAM) 230 is configured to temporarily store various data during operation of a processor 250. In addition, computer programs for performing data processing, such as a program for training a neural network and a program for reconstructing a CT image etc., are also stored in the storage device 210. The storage device 210, the read-only memory 220, the random access memory 230, an input apparatus 240, the processor 250, a display device 260, and the interface unit 270 are connected through the internal bus 280.

After a user inputs an operation command through the input apparatus 240 such as a keyboard, a mouse etc., instruction codes of the computer program instruct the processor 250 to execute an algorithm for training a neural network and/or an algorithm for reconstructing a CT image. After obtaining a reconstruction result, display the reconstruction result on the display device 260 such as an LCD display etc., or output a processing result directly in a form of a hard copy such as printing etc.

Figure 3:
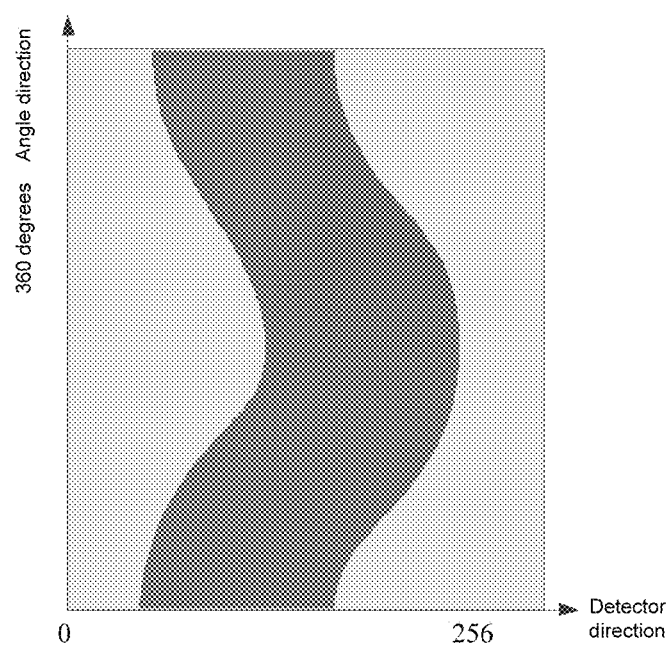
FIG. 3 illustrates an example of a sinogram of projection data obtained by the device according to an embodiment of the present disclosure.

According to an embodiment of the present disclosure, CT scanning is performed on an object to be inspected using the above device to obtain a raw attenuation signal. Data of the attenuation signal may also be displayed in a form of a two-dimensional image. FIG. 3 illustrates an example of the data of the attenuation signal obtained according to an embodiment of the present disclosure. A horizontal axis direction of the raw attenuation signal shown in FIG. 3 represents a detector pixel sequence (for example, from 1 to 256) and a vertical axis of the raw attenuation signal shown in FIG. 3 represents an angle (for example, from 1 degree to 360 degrees). The raw attenuation signal is preprocessed to obtain projection data. For example, the raw attenuation signal may be preprocessed by a CT scanning system by performing negative logarithmic transformation etc. to obtain the projection data. The processor 250 in the control device then executes a reconstruction program to process projection data using a trained neural network to obtain the estimated projection data, so as to further performs a reconstruction operation on the estimated projection data through the analytical reconstruction network layer to obtain a reconstructed image, and further process the reconstructed image to obtain a final image. For example, the reconstructed image is processed using a trained (for example, U-shaped) convolutional neural network to obtain feature images on various scales, which are fused to obtain a resultant image.

In the embodiments of the present disclosure, projection data is processed using a trained convolutional neural network in a projection domain, then a reconstruction operation is performed through the reconstruction layer to reconstruct the image, and finally the reconstructed image is processed by the image domain network to obtain the estimated image. The convolutional neural network may comprise convolutional layers, pooling layers, and fully connected layers. The convolutional layers each identify characteristics of an input data set, and each convolutional layer has a nonlinear activation function operation. The characteristics is refined by the pooling layers, and typical operations comprise mean-pooling and max-pooling. One or more fully connected layers implement a high-order signal nonlinear synthesis operation, and the full connected layer also has a nonlinear activation function. The commonly used nonlinear activation functions comprise Sigmoid, Tanh, ReLU etc.

Although the above description is mainly described for a case that 360-degree circular scanning is performed to obtain complete projection data, it can be understood by those skilled in the art that the above solution can be applied to the case of incomplete projection data, for example, to detector under-sampling, sparse-angle sampling, limited-angle, intra-reconstruction, or straight line trajectory scanning etc.

Figure 4:
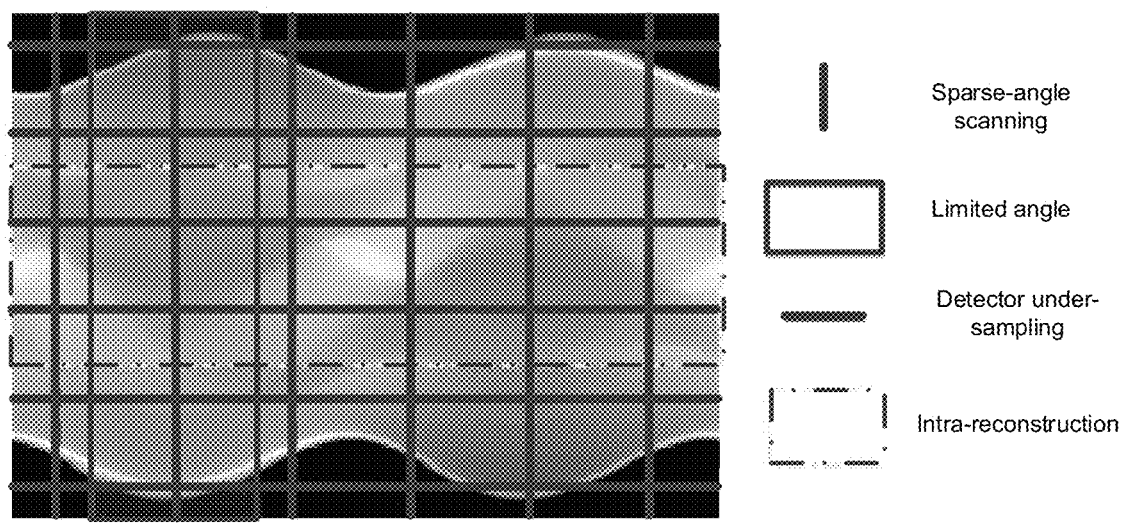
FIG. 4 illustrates a schematic diagram of data contained in a sinogram in different scanning modes.

FIG. 4 illustrates a schematic diagram of data contained in a sinogram in different scanning modes. As shown in FIG. 4, the projection data obtained by sparse-angle sampling CT scanning, limited-angle CT scanning, detector under-sampling CT scanning, and intra-reconstruction CT scanning are all incomplete. Although the projection data is incomplete, with the above solutions, an image with a higher quality can be reconstructed from the incomplete projection data.

Figure 5:
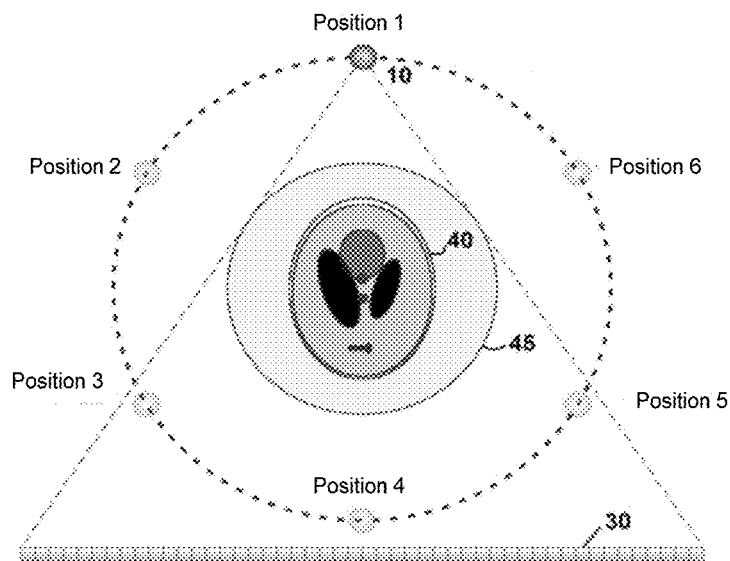
FIG. 5 is a schematic diagram of a scanning apparatus implementing a sparse-angle sampling and scanning mode according to an embodiment of the present disclosure.

FIG. 5 is a schematic diagram of a scanning apparatus implementing a sparse-angle sampling and scanning mode according to an embodiment of the present disclosure. As shown in FIG. 5, after X rays emitted by the radiation source 10 pass through the object 40 to be inspected in a field of view 45, the X rays are received by the detector 30, are converted into an electrical signal, and are further converted into a digital signal indicating an attenuation value, which is pre-processed as projection data, so as to be reconstructed by a computer. With the solutions described above, an image with a higher quality can be reconstructed by the neural network which is trained by using the method according to the present disclosure even if CT scanning is performed on the object 40 to be inspected at a plurality of rotational positions (for example, six positions). In this way, an image with a higher quality may be reconstructed from incomplete projection data even if sparse-angle CT scanning is performed on the object to be inspected.

Figure 6A:
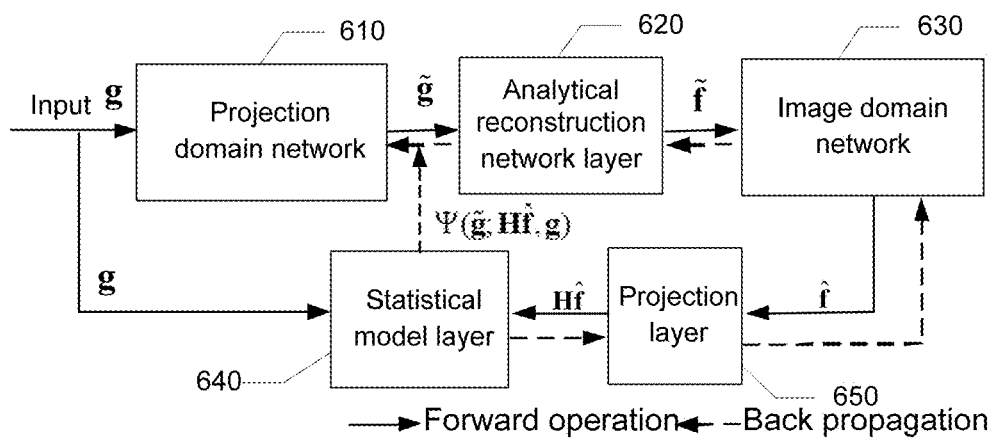
FIG. 6A illustrates a structural diagram of a neural network according to an embodiment of the present disclosure.
Figure 6B:
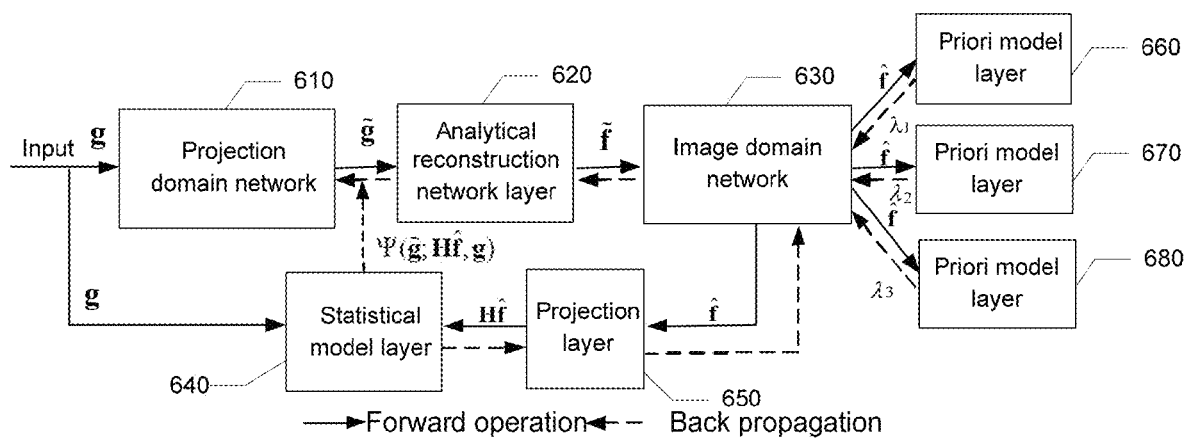
FIG. 6B illustrates another structural diagram of a neural network according to an embodiment of the present disclosure.

FIG. 6A illustrates a structural diagram of a convolutional neural network according to an embodiment of the present disclosure. As shown in FIG. 6A, an input of an unsupervised X-ray CT image reconstruction neural network is projection data obtained by performing CT scanning and then preprocessing on the attenuation signal. The neural network may mainly comprise a projection domain network 610, an analytical reconstruction network layer 620, and an image domain network 630. Further, the neural network according to the embodiment of the present disclosure may further comprise a statistical model layer 640 and a projection layer 650. FIG. 6B illustrates another structural schematic of a convolutional neural network according to an embodiment of the present disclosure. Unlike the structure of the neural network shown in FIG.

6A, the neural network in FIG. 6B may further comprise at least one a priori model layer, and FIG. 6B illustrates three priori model layers 660, 670, 680 as an example.

Figure 7:
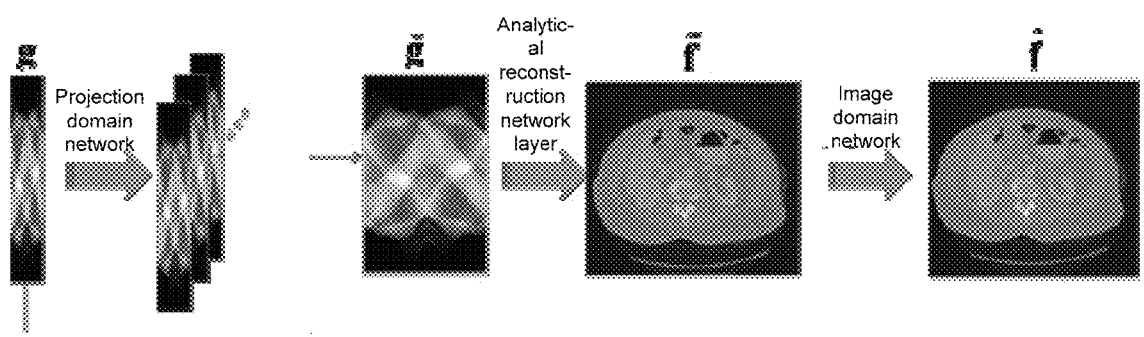
FIG. 7 is a diagram illustrating images processed by various modules in architecture of the neural network shown in FIGS. 6A and 6B.

FIG. 7 is a schematic diagram illustrating images processed by various modules in architecture of the neural network shown in FIGS. 6A and 6B. As shown in FIG. 7, the input projection data may be expressed as g, data obtained after being processed by the projection domain network is expressed as $\tilde{g}$, which may be referred to as "estimated projection data", data obtained after being processed by the analytical reconstruction network layer is expressed as $\hat{f}$, and data obtained after being processed by the image domain network is expressed as $\tilde{f}$, which may be referred to as "estimated image". The projection domain network 610 is used for recovery of projection data and estimation of missing data to obtain complete projection data. The analytical reconstruction network layer 620 comprises a plurality of layers which are constructed based on an analytical reconstruction algorithm known by those skilled in the art, but are specifically matriculated. A special construction of these layers will be described in detail below. The image domain network 630 is used for reducing artifacts and errors in a reconstructed image, thereby further improving the quality of the reconstructed image. The projection layer 650 performs a projection operation on the estimated image $\tilde{f}$ by using a projection matrix of a CT scanning system to obtain projection of the estimated image, so as to construct a cost function consistent with the projection, which is similar to a cost function of ART. The statistical model layer 640 constitutes a cost branch of the network to describe a statistical fluctuation at the time of collection of projection, so as to determine consistency among the input projection data, the estimated projection data, and the projection result of the estimated image based on a projection model, all or a part of which may be a likelihood relation cost function that is satisfied under collected X-ray CT data and true data under a statistical model.

As shown in FIG. 6B, the neural network according to the embodiment of the present disclosure may further comprise priori model layers 660, 670, 680, which constitute an end cost function of the network. It may be understood by those skilled in the art that the three priori model layers in FIG. 6B are merely illustrated as an example, and the neural network may also comprise one or other numbers of parallel priori model layers (also referred to as constraints). The priori model layers 660, 670, 680 may be at least one of a total variation of local conditions, a Markov field priori, a texture priori, and sparsity of a feature space, and other models, respectively. Parameters λ are used to adjust importance (or intensity) of the priori models or constraints. FIG. 6B illustrates $\lambda_1$, $\lambda_2$ and $\lambda_3$, which may be used as weights for back-propagation of the priori model layers 660, 670, 680.

A forward operation flow of the overall network is shown by solid arrows in FIGS. 6A and 6B. The projection data input to the projection domain network is expressed as $g=\{g_1, g_2, \ldots, g_M\}$, and the estimated projection data output by the projection domain network 610 is expressed as $\tilde{g}=\{\tilde{g}_1, \tilde{g}_2, \ldots, \tilde{g}_{M'}\}$, wherein usually M'≥M. After the output of the projection domain network 610 passes through a weighting layer shown in FIG. 9, $Diag(W)\tilde{g}=\{W_1\tilde{g}_1, W_2\tilde{g}_2, \ldots, W_{M'}\tilde{g}_{M'}\}$ is obtained, wherein $W_1, W_2, \ldots, W_{M'}$ represent weighting coefficients. After the weighted data passes through a ramp filtering layer, a filtered sinogram $h \otimes Diag(W)\tilde{g}$ is obtained, wherein h is a discrete ramp filtering operator, which may be, for example, a Ram-Lak filter or a Shepp-Logan filter. In one example, h may be a discrete ramp convolutional kernel. After the filtered data passes through a back-projection layer, an output of the analytical reconstruction network layer is obtained as $\hat{f}=H_R^T h \otimes Diag(W)\tilde{g}$, wherein a superscript T represents transposition of a matrix, $H_R$ is a system matrix for M'×N dimensional reconstruction, and similarly to a forward projection matrix H (system projection matrix), is determined by the architecture of the CT scanning system and a scanning method, and $H_R^T$, completes a back-projection process, specifically, a weighted back-projection process under fan beam or cone beam scanning. After passing through the reconstruction network, $\hat{f}$ continues to be fed forward to pass through the image domain network, so as to obtain an estimated image $\tilde{f}$ of a scanned object. An output of each priori model layer is a cost function $\varphi(\tilde{f})$. $\varphi(\tilde{f})$ may be an organic combination of, for example, one of a full variation of local conditions, a Markov field priori, a texture priori, sparsity of a feature space, etc. or a combination thereof.

Error back-propagation of the overall network is back-propagated, as indicated by dashed arrows shown in FIGS. 6A and 6B. The back-propagation is divided into two main lines, which are a consistency cost of a data model and a coincidence cost of the priori models. A priori error is defined as $\varepsilon^{Pr}=\varphi(\tilde{f})$ according to a coincidence cost function $\varphi(\tilde{f})$ of the priori models. Importance of each $\varphi(\tilde{f})$ in an error feedback process, that is, importance of the priori models in an image space, is defined by a parameter λ. An error of the coincidence cost of the priori models is propagated to the image domain network, and derivatives of an input and parameters of each layer with respect to the cost function are calculated according to a layer-wise forward chain derivation rule. Then, the priori error of the analytical reconstruction network layer is back-propagated through the analytical reconstruction network layer as follows:

$$\frac{\partial \varepsilon^{Pr}}{\partial \tilde{g}} = Diag(W)\left(h \otimes H_R \frac{\partial \varepsilon^{Pr}}{\partial \hat{f}}\right) \quad (1)$$

Assuming that $\varphi_N$ represents an processing function of the image domain network, i.e., $\tilde{f}=\varphi_N(\hat{f})$, and then the back-propagation may further be expressed as $$\frac{\partial \varepsilon^{Pr}}{\partial \tilde{g}} = Diag(W)\left(h \otimes H_R \frac{\partial \varepsilon^{Pr}}{\partial \hat{f}} \cdot \frac{\partial \hat{f}}{\partial \hat{f}}\right) = Diag(W)\left(h \otimes H_R \frac{\partial \varphi(\tilde{f})}{\partial \hat{f}} \cdot \frac{\partial \varphi_N(\hat{f})}{\partial \hat{f}}\right).$$

The consistency cost of the data model comprises at least one of a likelihood relation cost function and a cost function consistent with the projection. The likelihood relation cost function is defined according to a signal statistical model, and a Gaussian noise distribution, a Poisson probability distribution, a Gaussian and Poisson mixed probability distribution, etc. may be used to calculate a likelihood function $L(g; \tilde{g})$ (a negative value thereof is obtained under a framework of error minimization). Here, the smaller the defined $L(g; \tilde{g})$ becomes, the more consistent the input projection data g and the estimated projection data $\tilde{g}$ will be.

The cost function consistent with the projection reflects a difference between a projection result obtained after a previous estimation result (estimated image) is projected through the projection layer and the estimated projection data g̃. The consistency cost function of the data model may be expressed as:

$$\Psi(\tilde{g}; H\hat{f}, g) = L(g; \tilde{g}) + \beta \|\tilde{g} - H\hat{f}\|^2 \qquad (2)$$

Thus, error transfer relations from the consistency of the data model are:

$$\frac{\partial \Psi}{\partial \tilde{g}} = \frac{\partial L(g; \tilde{g})}{\partial \tilde{g}} + 2\beta(\tilde{g} - H\hat{f}), \qquad (3a)$$

$$\frac{\partial \Psi}{\partial \hat{f}} = 2\beta H^T(H\hat{f} - \tilde{g}) \qquad (3b)$$

where β is a Lagrangian multiplier parameter, $\beta\|\tilde{g}-H\hat{f}\|^2$ is a cost function consistent with the projection, H is a system projection matrix, and $$\frac{\partial \Psi}{\partial \tilde{g}} \text{ and } \frac{\partial \varepsilon^{Pr}}{\partial \tilde{g}}$$

are propagated to the projection domain network together, to update parameters of various layers $$\frac{\partial \Psi}{\partial \hat{f}}$$

is propagated to the image domain network and is propagated to the projection domain network through the analytical reconstruction network layer.

According to an embodiment of the present disclosure, a training data set may comprise a simulation model covering an application scenario which is generated using a simulation tool, and a projection data set is generated according to parameters of an actual CT system and an actual scanning method. An object is scanned on the actual system to obtain CT scanning data. A part of the CT scanning data is input to the network as the training data set for further training, and another part of the CT scanning data is collected to test a training effect of the network.

Figure 8:
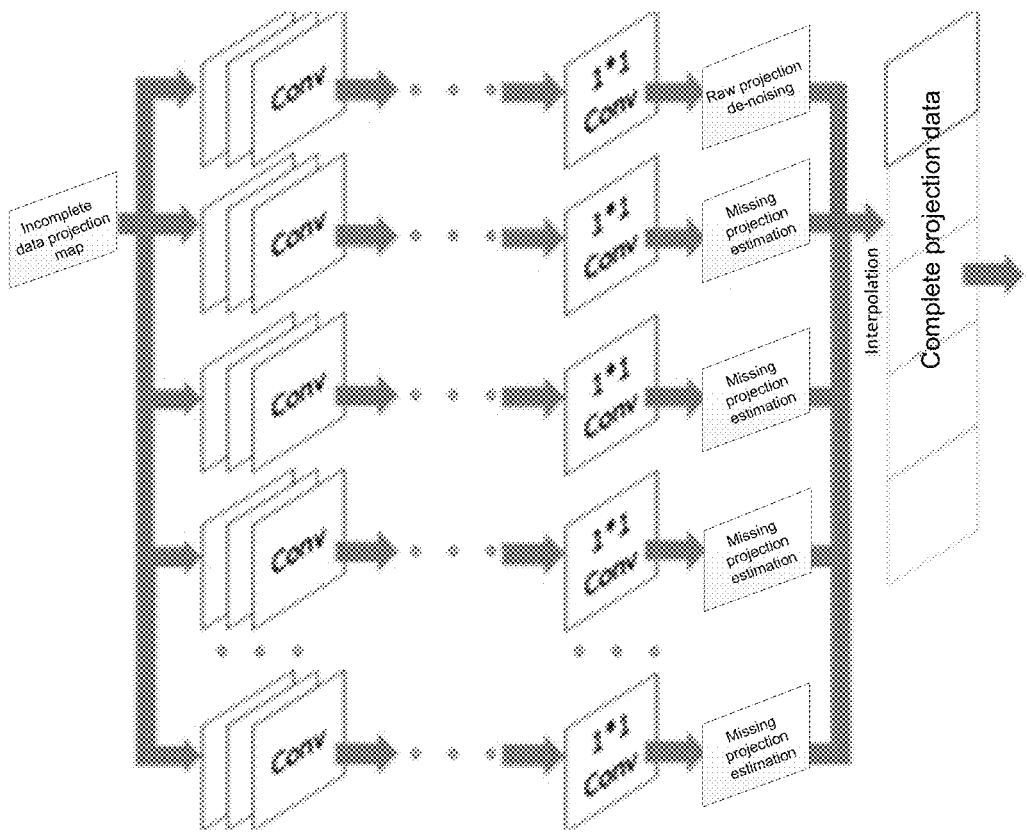
FIG. 8 illustrates a structural diagram of a projection domain network used in a device according to an embodiment of the present disclosure.

FIG. 8 illustrates a structural block diagram of a projection domain convolutional neural network applied to a sparse angle in a device according to an embodiment of the present disclosure. A collected raw attenuation signal is preprocessed by, for example, a CT scanning system by using logarithmic transformation etc. (the preprocessing may further comprise correction with air value, consistency correction etc.) to obtain projection data g. The projection domain network 610 uses the projection data as an input. The projection domain network complements missing data by using the convolutional neural network. An input of parallel networks shown in FIG. 8 is the data collected in a case of sparse angle, estimated missing angle data is divided into multiple groups, and each group of data is data which has the same scale as that of a collection angle, and has a constant angle from the collection angle. For each group, existing projection data is used as the input data, and multi-level feature extraction is performed on the input data by concatenated convolutional layers (Cony) including an activation function, and missing projection data is obtained by a fully connected layer (which may be implemented by using a 1×1 convolutional layer).

For the projection domain network 610, 2-dimensional convolutional kernels on all scales each have two dimensions, a first of which is defined here as a detector direction and a second dimension of which is defined here as a scanning angle direction. Each of the convolutional kernels may not necessarily have the same length in the two dimensions. Generally, the convolutional kernel has a greater scale in the detector direction than in the scanning angle direction, for example, the convolutional kernel is a convolutional kernel of 3*1, 5*3, 7*3, or 9*3. The convolutional kernel may also have a size which is determined according to a proportional relationship between two dimensions of a projection map. There may be a plurality of convolutional kernels set for each scale. The convolutional layer is followed by an activation function.

For example, the projection domain network has a main role of increasing a resolution of the projection data in the angle direction. The projection domain network may comprise a five-branch parallel network shown in FIG. 8. Each branch comprises, for example, a seven-layer convolutional neural network. A rectangular convolutional kernel is used as the middle part due to a proportional relationship between a number of detectors and a number of projections (FIGS. 12A, 12B, and 12C). Convolutional kernels in the last layer each have a size of 1*1 to achieve full connection in a feature map direction, and at an output of each convolutional layer, a Relu function is used as a nonlinear activation function. During a convolution process, boundary data is complemented by using periodicity of the convolution in the angle direction, so that the feature map has a size which is always the same as that of the input.

As shown in FIG. 8, after being processed by the seven-layer network respectively and then being interpolated, four groups of missing projection estimation are combined with one group of projection which is collected and is de-noised through the network to form an estimated projection map at 360 dense angles, which is propagated to the analytical reconstruction network block. Although FIG. 8 illustrates the convolutional network including a plurality of parallel branches, it may be appreciated by those skilled in the art that the technical solutions according to the present disclosure may also be implemented by other forms of networks. Although in the above embodiment, the projection domain network is used to recover the missing data, that is, the projection domain network is applied to a case where incomplete data is obtained by using CT scanning, it may be understood by those skilled in the art that the above projection domain network may process complete projection data, thereby improving the quality of the projection data.

Figure 9:
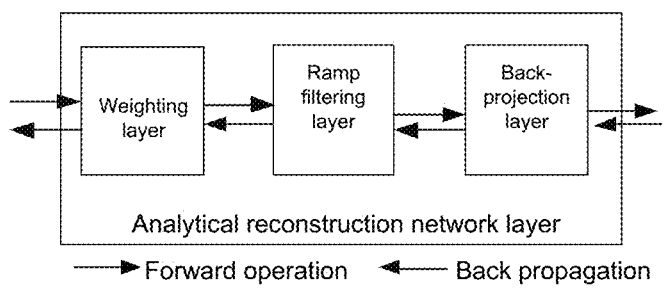
FIG. 9 illustrates a structural diagram of an analytical reconstruction network layer used in a device according to an embodiment of the present disclosure.

FIG. 9 illustrates a structural block diagram of an analytical reconstruction network layer used in a device according to an embodiment of the present disclosure. The analytical reconstruction network layer 620 may comprise a weighting layer (optional), a ramp filtering layer (optional), and a back-projection layer. The weighting layer performs cosine weighting on each data. The ramp filtering layer performs a ramp filtering operation in a conventional analytical reconstruction method. The back-projection layer performs back projection from the projection domain to an image domain (distance-weighted back-projection for a fan beam CT back-projection layer and a cone beam CT back-projection layer). Generally, the analytical reconstruction network layer is designed and implemented according to the architecture of the CT imaging system, and no parameter is modified in the network training process.

For example, the analytical reconstruction network layer 620 explicitly adds the analytical reconstruction algorithm into a structure of the network, thereby simplifying the physical laws which the network needs to learn. The analytical reconstruction network layer 620 comprises three layers.

A first layer is a weighting layer, which, in the present application, performs cosine normalization on data in the detector direction according to geometric parameters of the CT scanning using a cosine vector of 216*1, so as to achieve point multiplication with the estimated projection, and extend the cosine normalized vector in the angle direction to obtain a weighting matrix W of 216*360, wherein values in each column of W are equal. After passing through the W layer, the projection map is expressed as $\tilde{g}_W=\tilde{g}* W$.

A second layer is a ramp filtering layer, which performs a discrete filtering operation on the projection map in the detector direction, that is, in the present application, performs filtering on a vector of 216 detector responses at each angle, which may be described as matrix multiplication, to generate a filtering matrix F of 216*216. A matrix multiplication is performed on the filtering matrix F and the weighted projection data according to an equation of $\tilde{g}_F=F*\tilde{g}_W$ to complete a filtering process.

A third layer is a back-projection layer, which reconstructs the filtered projection into an image according to the geometric relationship, which, in the present application, generates a distance-weighted back-projection matrix $H_R^T$ according to the geometric parameters by using a pixel driving method. The filtered image is back-projected to obtain a reconstructed image in the image domain.

Figure 10:
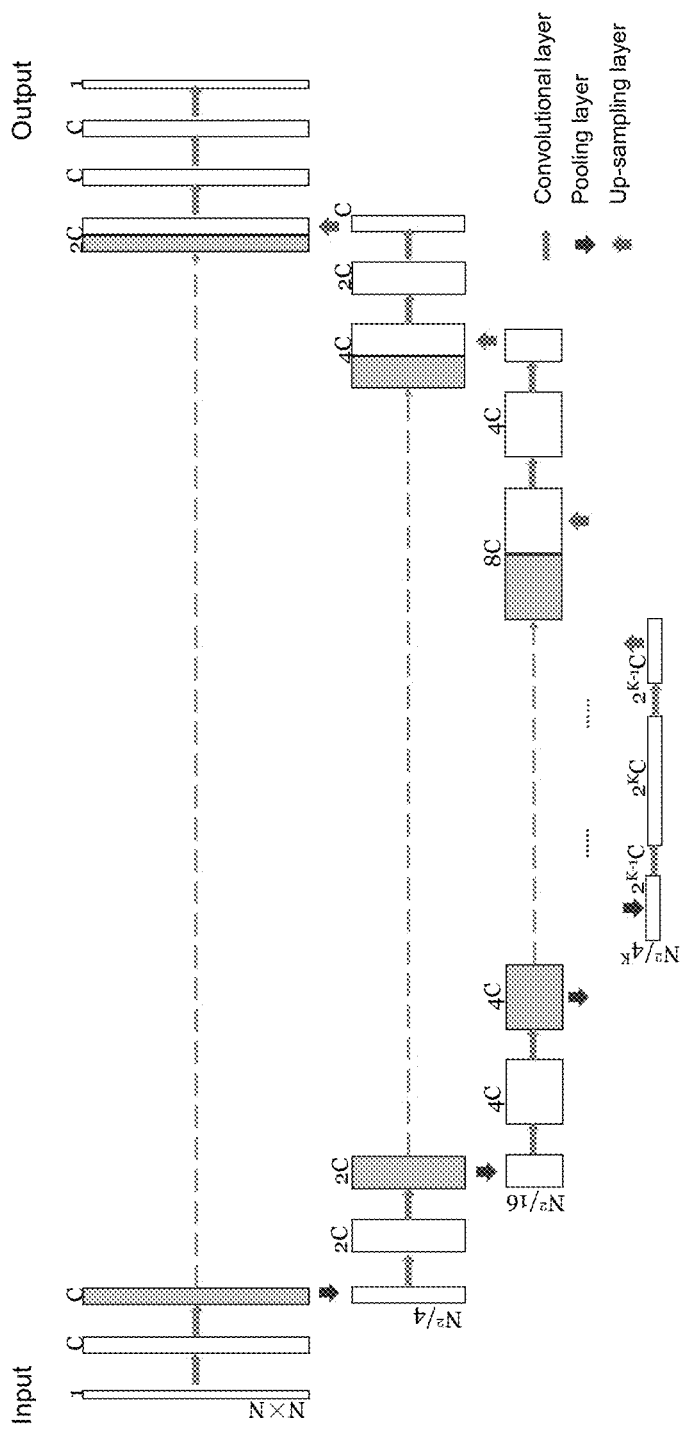
FIG. 10 illustrates an exemplary structural diagram of an image domain network in a device according to still another embodiment of the present disclosure.

FIG. 10 illustrates an exemplary schematic diagram of an image domain network used in a device according to yet another embodiment of the present disclosure. The image domain network may perform suppression on artifacts and noise in the image domain. For example, the image domain network 630 shown in FIG. 6 may be a U-shaped network shown in FIG. 10.

For example, feature maps on different scales may be obtained by processing the reconstructed image using the U-shaped convolutional neural network shown in FIG. 10, and may be combined to obtain a resultant image. More specifically, the feature maps on the plurality of scales are merged level by level by using an up-sampling operation, to finally obtain a resultant image of an object to be inspected. For example, the image domain network further applies prior knowledge to remove artifacts on the basis of the analytical reconstruction of the estimated projection. In the present embodiment, the image domain network adopts the U-shaped network design in this example (as shown in FIG. 10). For example, pooling is performed on the reconstructed image of 200*200 four times, to gradually reduce a size of the feature maps, so as to increase global features of a learned image in an acceptance domain. Then, the feature maps are gradually expanded and merged with feature maps with the same size without down-sampling, to prevent information loss caused by down-sampling, so as to finally recover an image with a size of 200*200, which is processed by the network to finally reconstruct the image. In the image domain network shown in FIG. 10, convolutional kernels in different layers each have a size of, for example, 3*3. In a process of down-sampling the image, as a size of the feature maps decreases, a number of feature maps increases gradually. In an up-sampling process, as a size of the feature maps decreases, the number of feature maps decreases.

Although FIG. 10 exemplary illustrates the image domain network to have a specific structural of a U-shaped network, it may be appreciated by those skilled in the art that the technical solutions according to the present disclosure may also be implemented by U-shaped networks having other structures. In addition, it may also be appreciated by those skilled in the art that the technical solutions according to the present disclosure may also be implemented by using another network, for example, auto-encoder, fully convolution neural network etc. as the image domain network.

According to an embodiment of the present disclosure, all convolutional kernels of the projection domain network 610 and the image domain network 630 have network parameters to be determined, which may be randomly initialized, or may be updated using other pre-training results obtained in other ways during the network training process. In addition, the network processes the input data in the projection domain and the image domain, respectively, so that an objective function to be optimized (often referred to as a loss function in the deep learning field) achieves an optimal result. Since adjacent pixels in the projection domain and the image domain have different geometric relationships, the projection domain convolutional layer and the image domain convolutional layer may complement each other.

Figure 11:
FIG. 11 illustrates a structural diagram of a smooth conditional convolutional kernel used in a convolutional neural network according to an embodiment of the present disclosure.

According to a specific example of an embodiment of the present disclosure, in the image domain, this calculation may be performed using a fixed convolutional kernel $w_0$ based on the priori knowledge of image continuity with neighborhood similarity constraints. A fixed 3*3 convolutional kernel design is represented in FIG. 11. Therefore, a cost function for smoothing the image may be used as the objective function to be optimized, which may be expressed as $$\min_{\hat{f}} \|w_0 \otimes \hat{f}\|_2^2.$$

For the design of the consistency cost function Ψ of the data model, in this example, the collected projection data g is a set of samples which conform to an independent Gaussian distribution, and has a mean value which is an integral of linear attenuation coefficients of an scanned object on a corresponding ray path. A first term in the constraints is a Gaussian model likelihood cost function, which completes maximum likelihood estimation constraints from the samples g to distribution true values, and is only applicable to a network which is partially de-noised by a collected sparse-angle projection, and a second term in the constraints represents consistency constraints between the projection and the image, and is applicable to each part of the projection domain network.

$$\Psi = (g - \tilde{g}_{sub})^T \Sigma^{-1} (g - \tilde{g}_{sub}) + \beta (\tilde{g} - H^*\hat{f})^T \cdot (\tilde{g} - H^*\hat{f}) \quad (4)$$

where g is the collected sparse-angle projection data, $\tilde{g}_{sub}$ is an estimated value on the ray path corresponding to the collected sparse-angle projection data, $\hat{f}$ is an estimated image output by the network, Σ is a diagonal matrix in which diagonal elements is variances of the projection data, H is a system projection matrix, and β is a Lagrangian multiplier parameter.

The back-propagation of the coincidence cost function of the priori models may be expressed as follows:

$$\frac{\partial \varphi(\hat{f})}{\partial \hat{f}} = w_0 \otimes (w_0 \otimes \hat{f}), \quad (5)$$

An image output by the network is derived, and a gradient is back-propagated through the analytical reconstruction layer and then is applied to the network convolutional kernels in the projection domain.

In a data fidelity constraint $\Psi$, there are both $\hat{f}$ and $\tilde{g}$, and the gradient is back-propagated while updating the projection domain network from $\tilde{g}$ and propagating $\hat{f}$ to the image domain network.

$$\frac{\partial \Psi}{\partial \tilde{g}} = 2 * \sum^{-1}(g - \tilde{g}_{sub}) + 2 * \beta(g - H\hat{f}) \quad (6)$$

$$\frac{\partial \Psi}{\partial \hat{f}} = 2 * H^T \beta (H\hat{f} - g) \quad (7)$$

Two data sets which are a simulation data set and an actual data set may be used in the process of training the neural network.

The simulation data set is a human CT tomogram with a high quality which is from a source such as a network etc. As an example, according to a mechanical geometry, a simulation projection data is generated at an angle from 3 degrees to 358 degrees with an increment angle step of 5 degrees, with a number of photons being $10^5$. A set of simulation projection data on a scale of 216*72 is obtained. ⅘ of the set is used for unsupervised training of the network, and ⅕ of the set is used as a verification set to control a normalization effect of the network.

An actual data set may be projections generated by scanning a phantom body on a fan beam spiral CT platform at an angular interval of 5 degree using an array of 216 detectors, so as to control time during which tube current is generated to reach a normal dose. Another different group of phantom bodies is scanned in the same manner to obtain projections as a test set, which is used to test the effect of the network after the training is completed.

According to an embodiment of the present disclosure, a direct training manner is used. In a direct training process, weights for the convolutional kernels of the projection domain network and the image domain network are randomly initialized, the actual collected data set is used for training, and after the training is completed, the training effect of the network is verified by another set of actual collected data as a test set.

According to another embodiment of the present disclosure, a direct training manner with the auxiliary of pre-training may be used. In a data simulation phase, projection data with a high quality may be generated. The process of using the simulation data set to train the neural network may be referred to as "pre-training". Firstly, complete projection data at 360 angles is generated by using the simulation data, to perform supervised training on parallel projection estimation networks respectively. After the training is completed (the simulation data set is trained to converge), values of the projection estimation network are used as initial values of the overall projection domain network, and then the network is trained as a whole in a direct training manner without assigning the initial values.

For an actual CT scanning process, the collected data is input into the above training process to obtain the trained network (at this time, parameters of the network are fixed), so as to obtain the reconstructed image.

FIG. 13A is a schematic flowchart illustrating an image processing method according to an embodiment of the present disclosure. As shown in FIG. 13A, in step S131, a projection data of an object is acquired by a CT scanning system. In step S132, the projection data is processed by using a convolutional neural network, to acquire an estimated image of the object.

The neural network according to the embodiment of the present disclosure may comprise a projection domain network, an analytical reconstruction network layer, and an image domain network. The projection domain network is used to process input projection data to obtain estimated projection data. The analytical reconstruction network layer performs analytical reconstruction on the estimated projection data to obtain a reconstructed image. The image domain network processes the reconstructed image to obtain an estimated image. The neural network according to the embodiment of the present disclosure may comprise a projection layer for performing a projection operation on the estimated image by using a system projection matrix of a CT scanning system to obtain a projection result of the estimated image; and a statistical model layer for determining consistency among the input projection data, the estimated projection data, and the projection result of the estimated image based on a statistical model.

The image processing method according to the embodiment of the present disclosure may further comprise training the neural network. FIG. 13B is a schematic flowchart illustrating a method of training a neural network according to an embodiment of the present disclosure.

As shown in FIG. 13B, in step S1321, in a first training process, a simulation data set is used as input projection data to train a neural network. The first training process is to pre-train the neural network to speed up the training process.

In step S1322, in a second training process, the acquired true CT data is used as input projection data to further train the neural network. In step S1322, the image domain network may be adjusted by using the priori model cost function based on the estimated image, and a gradient is back-propagated through the analytical reconstruction network layer to adjust parameters of convolutional kernels of the projection domain network. In step S1322, parameters of convolutional kernels of the image domain network and the projection domain network are adjusted by using a consistency cost function of a data model based on the input projection data, the estimated projection data, and the projection result of the estimated image. A more specific implementation may be known with reference to the embodiment described above in connection with the network structure shown in FIGS. 6A and 6B, and details thereof will not be described here again.

Although sparse-angle sampling and scanning etc. is given above, it may be reached by those skilled in the art that the training method according to the present disclosure may also be used in a limited-angle CT scanning system, an intra-reconstruction scanning system, a detector under-sampling scanning system, and a straight line trajectory CT scanning system.

FIG. 14 is schematic diagram of a scanning apparatus which implements limited-angle CT scanning according to another embodiment of the present disclosure. As shown in FIG. 14, after X rays emitted by the radiation source 10 pass through the object 40 to be inspected in a field of view 45, the X rays are received by the detector 30, are converted into an electrical signal to obtain attenuation data, which is preprocessed to obtain projection data to be reconstructed by a computer. With the solutions described above, an image with a higher quality can be reconstructed using the trained neural network even if limited-angle (for example, 130 degrees) scanning is performed on the object 40 to be inspected.

FIG. 15 is a schematic diagram of a scanning apparatus which implements an intra-reconstruction scanning method according to yet another embodiment of the present disclosure. As shown in FIG. 15, after X rays emitted by the radiation source 10 pass through a part of the object 40 to be inspected in a field of view 45, the X rays are received by the detector 30, are converted into an electrical signal, are further converted into a digital signal indicating an attenuation value as projection data to be reconstructed by a computer. With the solutions described above, an image with a higher quality can be reconstructed using the trained neural network even if intra-reconstruction CT scanning is performed on the object 40 to be inspected.

FIG. 16 is a schematic diagram of a scanning apparatus which implements a detector under-sampling scanning method according to yet another embodiment of the present disclosure. As shown in FIG. 16, after X rays emitted by the radiation source 10 pass through the object 40 to be inspected in a field of view 45, the X rays are received by the detector 30, are converted into an electrical signal, are further converted into a digital signal indicating an attenuation value as projection data to be reconstructed by a computer. In this example, the detector 30 is set to be under-sampled, for example, under-sampling is realized by spacing various detector units apart by a predetermined distance. In this way, with the solutions described above, an image with a higher quality can be reconstructed using the trained neural network even if detector under-sampling CT scanning is performed on the object 40 to be inspected.

FIG. 17 illustrates a schematic diagram of a scanning apparatus which implements straight line trajectory CT scanning according to yet another embodiment of the present disclosure. As shown in FIG. 17, after X rays emitted by the radiation source 10 pass through the object 40 to be inspected in a field of view, the X rays are received by the detector 30, are converted into an electrical signal, are further converted into a digital signal indicating an attenuation value as projection data, to be reconstructed by a computer. In this example, the object 40 to be inspected moves along a straight line trajectory on a conveyor belt parallel to the detectors. A field angle of the ray source formed by the detectors in a horizontal direction is as large as possible, and the detectors cover the object in a vertical direction. For example, the detector array is placed on an opposite side of the source, and a horizontal field angle θ of the rays is required to be more than 90 degrees, to obtain protection data through the straight line trajectory CT scanning. With the solutions described above, an image with a higher quality can be reconstructed using the trained neural network even if straight line trajectory CT scanning is performed on the object 40 to be inspected.

The embodiments of the present disclosure may firstly perform pre-training using simulation data and then perform unsupervised training using true data. Further, it is also possible to directly perform unsupervised training using a lot of true data. In this way, data information is deeply mined to form a convolutional neural network and system-specific parameters, and obtain an efficient CT image reconstruction method.

The method according to the present disclosure can be flexibly applied to different CT scanning modes and system architectures and can be used in the fields of medical diagnosis, industrial non-destructive detection and security inspection.

The foregoing detailed description has set forth various embodiments of the method and device for training a neural network via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the embodiments of the present disclosure has been described with reference to several typical embodiments, it is apparent to those skilled in the art that the terms are used for illustration and explanation purpose and not for limitation. The embodiments of the present disclosure may be practiced in various forms without departing from the spirit or essence of the embodiments of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. An image processing method, comprising:
acquiring, by a Computerized-Tomography (CT) scanning system, projection data of an object; and processing, by using a convolutional neural network, the projection data, to acquire an estimated image of the object;
wherein the convolutional neural network comprises:
a projection domain network for processing input projection data to obtain estimated projection data;
an analytical reconstruction network layer for performing analytical reconstruction on the estimated projection data to obtain a reconstructed image;
an image domain network for processing the reconstructed image to obtain an estimated image,
a projection layer for performing a projection operation on the estimated image by using a system projection matrix of the CT scanning system, to obtain a projection result of the estimated image; and
a statistical model layer for determining consistency among the input projection data, the estimated projection data, and the projection result of the estimated image based on a statistical model;
wherein the image processing method comprises training the convolutional neural network by:
adjusting parameters of convolutional kernels of the image domain network and the projection domain network by using a consistency cost function of a data model based on the input projection data, the estimated projection data, and the projection result of the estimated image.

2. The method according to claim 1, wherein training the neural network further comprises:
constructing a cost function consistent with the projection using the projection layer, constructing a likelihood relation cost function using the statistical model layer, and forming the consistency cost function of the data model using at least one of the cost function consistent with the projection and the likelihood relation cost function.

3. The method according to claim 1, wherein the convolutional neural network further comprises at least one priori model layer for adjusting the image domain network by using a priori model cost function based on the estimated image, and performing back propagation of a gradient through the analytical reconstruction network layer to adjust parameters of a convolutional kernel of the projection domain network.

4. The method according to claim 1, wherein a forward propagation process of the projection domain network, the analytical reconstruction network layer and the image domain network comprise:
expressing input projection data of the projection domain network as $g=\{g_1, g_2, \ldots, g_M\}$, expressing estimated projection data output by the projection domain network as $\tilde{g}=\{\tilde{g}_1, \tilde{g}_2, \ldots, \tilde{g}_{M'}\}$, wherein $M' \geq M$, after the estimated projection data is weighted, obtaining $\text{Diag}(W)\tilde{g}=\{W_1\tilde{g}_1, W_2\tilde{g}_2, \ldots, W_{M'}\tilde{g}_{M'}\}$, after the weighted projection data passes through a ramp filtering layer, obtaining $h \otimes \text{Diag}(W)\tilde{g}$, after the filtered data is back-projected, obtaining an output of the analytical reconstruction layer as $\tilde{f}=H_R^T h \otimes \text{Diag}(W)\tilde{g}$, and assuming that $\varphi_N$ represents a processing function of the image domain network, obtaining the estimated image output by the image domain network as $\hat{f}=\varphi_N(\tilde{f})$,
wherein a superscript T represents transposition of a matrix, h is a discrete ramp filtering operator, $H_R$ is a system matrix for M'×N dimensional reconstruction, N is a total number of pixels of the reconstructed image, and $W_1, W_2, \ldots, W_M$ represent weighting coefficients.

5. The method according to claim 4, wherein the consistency cost function of the data model is expressed as $\Psi(\tilde{g}; H\hat{f}, g)=L(g; \tilde{g})+\beta\|\tilde{g}-H\hat{f}\|^2$, and error transfer relations from the consistency of the data model are $$\frac{\partial \Psi}{\partial \tilde{g}} = \frac{\partial L(g; \tilde{g})}{\partial \tilde{g}} + 2\beta(\tilde{g}-H\hat{f}) \text{ and } \frac{\partial \Psi}{\partial \hat{f}} = 2\beta H^T(H\hat{f}-\tilde{g}),$$

wherein $L(g; \tilde{g})$ is a likelihood relation cost function, the smaller the $L(g; \tilde{g})$ becomes, the more consistent the projection data g and the estimated projection data $\tilde{g}$ will be, $\beta\|\tilde{g}-H\hat{f}\|^2$ is a cost function consistent with the projection, $\beta$ is a Lagrangian multiplier parameter, and H is a system projection matrix.

6. The method according to claim 3, wherein the priori model cost function $\varphi(\hat{f})$ comprises one or a combination of is a total variation of local conditions, a Markov field priori, a texture priori, and sparsity of a feature space, wherein $\hat{f}$ is the estimated image.

7. The method according to claim 6, wherein training the neural network further comprises: defining a priori model cost function $\varphi(\hat{f})$ using a priori error $\varepsilon^{Pr}$ as $\varepsilon^{Pr}=\varphi(\hat{f})$.

8. The method according to claim 6, wherein importance $\lambda$ of each prior model cost function $\varphi(\hat{f})$ in an error feedback process is used to adjust the image domain network.

9. The method according to claim 7, wherein in the analytical reconstruction network layer, a priori error of the analytical reconstruction network layer is back-propagated according to the following propagation relation:

$$\frac{\partial \varepsilon^{Pr}}{\partial \tilde{g}} = \text{Diag}(W)\left(h \otimes H_R \frac{\partial \varepsilon^{Pr}}{\partial \tilde{f}}\right)$$

where input projection data of the projection domain network is expressed as $g=\{g_1, g_2, \ldots, g_M\}$, estimated projection data output by the projection domain network is expressed as $\tilde{g}=\{\tilde{g}_1, \tilde{g}_2, \ldots, \tilde{g}_{M'}\}$, wherein $M' \geq M$, after the output is weighted, $\text{Diag}(W)\tilde{g}=\{W_1\tilde{g}_1, W_2\tilde{g}_2, \ldots, W_{M'}\tilde{g}_{M'}\}$ is obtained, after the weighted output passes through a ramp filtering layer, $h \otimes \text{Diag}(W)\tilde{g}$ is obtained, after the output from the ramp filtering layer is back-projected, an output of the analytical reconstruction network layer is $\tilde{f}=H_R^T h \otimes \text{Diag}(W)\tilde{g}$, wherein a superscript T represents transposition of a matrix, h is a discrete ramp filtering operator, $H_R$ is a system matrix for M'×N dimensional reconstruction, N is a total number of pixels of the reconstructed image, and $W_1, W_2, \ldots, W_M$ represent weighting coefficients.

10. The method according to claim 9, wherein the processing function of the image domain network is represented by $\varphi_N$ as $\hat{f}=\varphi_N(\tilde{f})$, and then the priori error is back-propagated according to the following propagation relation:

$$\frac{\partial \varepsilon^{Pr}}{\partial \tilde{g}} = \text{Diag}(W)\left(h \otimes H_R \frac{\partial \varepsilon^{Pr}}{\partial \hat{f}} \cdot \frac{\partial \hat{f}}{\partial \tilde{f}}\right) = \text{Diag}(W)\left(h \otimes H_R \frac{\partial \varphi(\hat{f})}{\partial \hat{f}} \cdot \frac{\partial \varphi_N(\tilde{f})}{\partial \tilde{f}}\right).$$

11. The method according to claim 10, further comprising: propagating $$\frac{\partial \Psi}{\partial \tilde{g}} \text{ and } \frac{\partial \varepsilon^{Pr}}{\partial \tilde{g}}$$

together to the projection domain network to update parameters of various layers.

12. The method according to claim 1, further comprising: acquiring attenuation signal data by the CT scanning system, and preprocessing the attenuation signal data to obtain input projection data.

13. The method according to claim 1, further comprising: acquiring the projection data of an object by the CT scanning system by using one of detector under-sampling scanning, sparse-angle scanning, intra-reconstruction scanning, limited-angle scanning, and straight line trajectory scanning.

14. The method according to claim 1, wherein the projection domain network comprises a plurality of parallel convolutional neural network branches.

15. The method according to claim 1, wherein the image domain network comprises a U-shaped convolutional neural network.

16. The method according to claim 1, wherein training the neural network further comprises: pre-training the convolutional neural network by using a simulation data set as the input projection data.

17. An image processing device, comprising:
a memory configured to store instructions and data, and
a processor configured to execute the instructions to:
  receive projection data of an object acquired by a Computerized-Tomography (CT) scanning system; and
  process the projection data by using a convolutional neural network, to acquire an estimated image of the object;
wherein the processor is further configured to construct the convolutional neural network to comprise:
a projection domain network for processing input projection data to obtain estimated projection data;
an analytical reconstruction network layer for performing analytical reconstruction on the estimated projection data to obtain a reconstructed image; and
an image domain network for processing the reconstructed image to obtain an estimated image,
a projection layer for performing a projection operation on the estimated image by using a system projection matrix of the CT scanning system, to obtain a projection result of the estimated image; and
a statistical model layer for determining consistency among the input projection data, the estimated projection data, and the projection result of the estimated image based on a statistical model;
wherein the processor is further configured to train the convolutional neural network by:
adjusting parameters of convolutional kernels of the image domain network and the projection domain network by using a consistency cost function of the data model based on the input projection data, the estimated projection data, and the projection result of the estimated image.

18. A non-transitory computer readable storage medium having computer instructions stored therein, which, when executed by a processor, implement the method according to claim 1.

* * * * *